(12) United States Patent
Lee

(10) Patent No.: US 7,734,120 B2
(45) Date of Patent: Jun. 8, 2010

(54) METHOD OF SCANNING A DOCUMENT USING A PRE-SCANNING OPERATION

(75) Inventor: Kyoung-jae Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1051 days.

(21) Appl. No.: 10/748,657

(22) Filed: Dec. 31, 2003

(65) Prior Publication Data

US 2004/0212852 A1 Oct. 28, 2004

(30) Foreign Application Priority Data

Jan. 15, 2003 (KR) ...................... 10-2003-0002720

(51) Int. Cl.
*H04N 1/04* (2006.01)
(52) U.S. Cl. ...................... 382/319; 358/488
(58) Field of Classification Search ................. 382/319; 358/488
See application file for complete search history.

(56) References Cited

U.S. PATENT DOCUMENTS

| | | | | |
|---|---|---|---|---|
| 2,287,413 A * | 6/1942 | Bruce et al. | ................. | 358/486 |
| 2,838,602 A * | 6/1958 | Sprick | ......................... | 382/193 |
| 4,329,717 A * | 5/1982 | Logie et al. | ................. | 358/446 |
| 4,682,241 A * | 7/1987 | Adachi | ....................... | 382/245 |
| 5,596,655 A * | 1/1997 | Lopez | ......................... | 382/173 |
| 6,151,426 A * | 11/2000 | Lee et al. | .................... | 382/319 |
| 6,385,351 B1 * | 5/2002 | Simske et al. | ............... | 382/312 |
| 6,453,080 B1 * | 9/2002 | Kao | ........................... | 382/312 |
| 6,674,901 B1 * | 1/2004 | Simske et al. | ............... | 382/180 |
| 6,753,982 B1 * | 6/2004 | Sheng et al. | ................ | 358/474 |

FOREIGN PATENT DOCUMENTS

JP 05-007290 1/1993

* cited by examiner

*Primary Examiner*—Bhavesh M Mehta
*Assistant Examiner*—Stephen R Koziol
(74) *Attorney, Agent, or Firm*—Staas & Halsey LLP

(57) ABSTRACT

A method of scanning a document to generate image data of the document, the method including performing a pre-scanning operation at a first predetermined resolution and speed according to a scan command until a current scanning area is located in a main-scan area; and performing a main-scanning operation at a second predetermined resolution and speed, until the current scanning area is beyond the main-scan area, after the current scanning area has been located in the main-scan area.

14 Claims, 6 Drawing Sheets

METHOD OF SCANNING A DOCUMENT USING A PRE-SCANNING OPERATION

CROSS-REFERENCE TO RELATED APPLICATIONS

This application claims the priority of Korean Patent Application No. 2003-2720, filed on Jan. 15, 2003, in the Korean Intellectual Property Office, the disclosure of which is incorporated herein in its entirety by reference.

BACKGROUND OF THE INVENTION

1. Field of the Invention

The present invention relates to a scanning method, and, more particularly, to a method of scanning a document using a pre-scanning operation, in which a pre-scanning operation is performed in a multi-functional peripheral device having a scanning operation to sense a starting portion of a business card-sized document, and then a main-scanning operation is performed for the business card-sized document to generate image data of the business card-sized document.

2. Description of the Related Art

A multi-functional peripheral device generally operates as a facsimile machine for transmitting a copy of an original image to another machine via a communication line, as well as a printer for printing data or an original copy of a document or image input to a computer. In other words, such a multi-functional peripheral device is manufactured by integrating operations of terminal devices such as a facsimile machine, a printer, and so forth, and has a personal computer (PC)-interface operation by which the multi-functional peripheral device is connected to a PC. These days, the use of a multi-functional peripheral device integrating the operations of a printer, a scanner, and a facsimile machine has increased in offices and in homes. Operations are added to such a multi-functional peripheral device so that the multi-functional peripheral device operates as a copier performing the operations of a scanner and a facsimile machine, as well as separately operating as a scanner, a printer, and a facsimile machine.

FIG. 1 is a block diagram of a general multi-functional peripheral device. Referring to FIG. 1, an optical system 100 includes a light source (not shown) and a photoelectric device (not shown) so that the density of an original image copy is photoelectrically converted and output as an electrical signal, and is moved by a step motor (not shown).

A scanner 101 converts the electrical signal output from the photoelectric device of the optical system 100 into digital data, performs several correction operations to improve image quality, and stores the processed image data in a memory 102.

The memory 102 stores image data that are processed by the scanner 101 using a control program of the multi-functional device, and then are transmitted to a computer (not shown) or a modem 106 or are printed via a printer 103 according to a user's request.

The printer 103 prints print data or image data stored in the memory 102 on a sheet of printing paper.

A manipulator 104 includes a key capable of setting and changing various operation modes of the multi-functional peripheral device and a display window for displaying the operational status of the multi-functional peripheral device.

An interface 105 transmits a command for operating the multi-functional peripheral device to a controller 107 according to a function of a program selected by a user so that the controller 107 transmits or receives data according to the corresponding command.

The modem 106 transmits/receives data to/from an external facsimile machine.

The controller 107 performs an operation corresponding to data transmitted via the key of the manipulator 104 and controls components of the multi-functional peripheral device so that a scanning operation and a printing operation are performed according to a signal transmitted from the interface 105.

FIG. 2A is a view illustrating a conventional scan area, and FIG. 2B is a flowchart of a conventional method of scanning documents. Referring to FIG. 2A, a document-1 203 and a document-2 204 are respectively positioned in upper and lower portions of a multi-functional peripheral device. Documents described herein refer to small-sized documents, such as small photograph-sized or business card-sized documents. FIG. 2A shows a physical scan area 200, a pre-scan area 201, and main-scan areas 202. According to the known art, the physical scan area 200 is the same as the pre-scan area 201, and the main-scan areas 202 correspond to areas in which the document-1 203 and the document-2 204 are positioned, respectively.

A process of scanning documents is described in more detail with reference to FIGS. 1, 2A, and 2B. At operation S210, a user gives a scan command for a document to be scanned via the manipulator 104, and then the scan command is transmitted to the scanner 101 via the controller 107. At operation S220, the scanner 101 performs a pre-scanning operation on the entire area of the physical scan area 200 to generate image data having a low resolution. Because an image is converted into image data, a PC scans the image data. However, the size of the data is large, and, thus, it takes a large amount of time to scan the image data. Thus, a pre-scanning operation is widely accepted. The pre-scanning operation refers to a method of scanning a document at a low resolution of 75 dpi, generating image data of the whole portion of the document, selecting a portion of the document by a program of the PC, and scanning the portion at a high resolution.

At operation S230, the entire image having the low resolution, scanned from the entire physical scan area 200, is displayed on the user's monitor. At operation S240, the user designates an area to be precisely scanned. At operation S250, the user designates a resolution and gives a main-scan command. At operation S260, the scanner 101 carries out a main-scanning operation to display image data having a high resolution in the area designated by the user on a screen of the user's PC monitor. At operation S270, the user converts image data into print data and transmits the print data to the printer 103 to be printed or stores the image data.

However, as described above, according to the related art, even though an area the user desires to scan is limited to the main-scan area in which a corresponding document is positioned, the entire area of the physical scan area is scanned (i.e., pre-scanned). As a result, unnecessary data are generated.

Also, if a plurality of business card-sized documents are scanned at the same time, the user must perform a pre-scanning operation to generate image data having a low resolution, designate an area for each of the plurality of business card-sized documents displayed on the screen, and carry out a main-scanning operation for each of the business card-sized documents. Thus, the scanning process is complicated and time-consuming.

SUMMARY OF THE INVENTION

It is an aspect of the present invention to provide a method of scanning a document in which an existing pre-scanning operation is performed to sense a starting portion of a main-scan area (i.e., a starting portion of a document) so that time, and an unnecessary amount of data required for generating an image having a low resolution, can be reduced.

It is another aspect of the present invention to provide a method of scanning a document in which a plurality of business card-sized documents can be scanned at the same time through a one-time scanning operation to generate image data, so that a scanning operation can be simply performed, and, in particular, so that a scanning operation can be conveniently performed at places such as government and public offices where scanning or copying of identification (ID) cards, photographs, business cards, or the like, is repeatedly performed.

Additional aspects and/or advantages of the invention will be set forth in part in the description that follows and, in part, will be obvious from the description, or may be learned by practice of the invention.

To achieve the above and/or other aspects of the present invention, there is provided a method of scanning a document to generate image data of the document, the method including performing a pre-scanning operation at a first predetermined resolution and speed according to a scan command until a current scanning area is located in a main-scan area; and performing a main-scanning operation at a second predetermined resolution and speed, until the current scanning area is beyond the main-scan area, after the current scanning area has been located in the main-scan area.

The pre-scanning operation is performed to sense a position of a starting portion of the main-scan area in which a document is positioned.

The main-scanning operation is performed to scan the document sensed during the pre-scanning operation and to generate image data of the document.

The predetermined resolution and speed are set by the user or set depending on the characteristics of the device used.

The method further includes inputting the number of documents for which image data are to be generated.

If the number of documents the user inputs is one, scanning of the document ends after the main-scanning operation ends.

If the number of documents the user inputs is two or more, a starting portion of a subsequent document is sensed after the main-scanning operation ends by repeating the pre-scanning operation.

The size of the document is the same as that of a business card.

To achieve the above and/or other aspects according to the present invention, there is provided a method of scanning documents, including placing one or more documents to be scanned within a physical scan area; performing a pre-scanning operation until a beginning of one of the documents is sensed; performing a main-scanning operation until an end of the one of the documents is sensed; and repeating said performing a pre-scanning operation and said performing a main-scanning operation until a bottom of the physical scan area is reached, thereby scanning the physical scan area once.

To achieve the above and/or other aspects according to the present invention, there is provided a scanner, including a pre-scanning unit performing a pre-scanning operation at a first predetermined resolution and speed until a current scanning area is located in a main-scan area; and a main-scanning unit performing a main-scanning operation at a second predetermined resolution and speed, until the current scanning area is beyond the main-scan area, after the current scanning area has been located in the main-scan area.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE INVENTION

Figure 1:
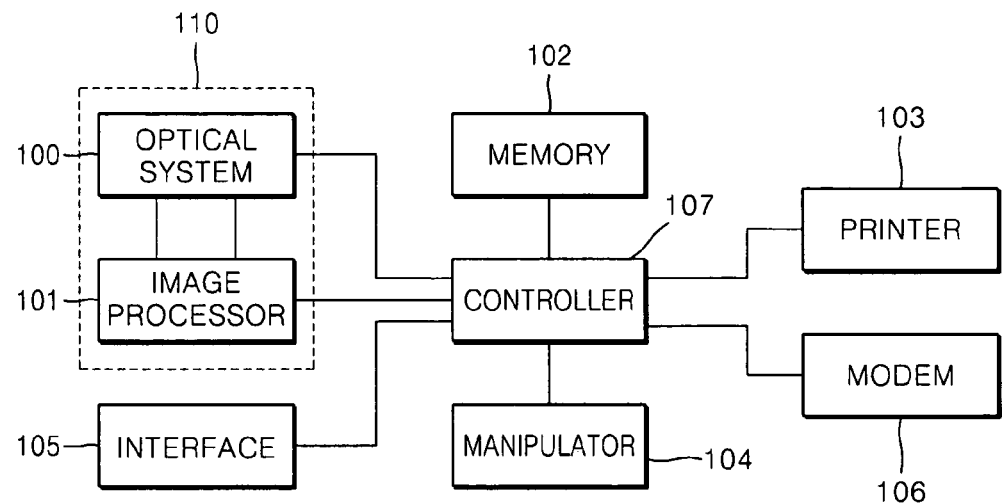
FIG. 1 is a schematic block diagram of a conventional multi-functional peripheral device.

Hereinafter, an embodiment of the present invention will be described in detail with reference to the attached drawings, wherein the like reference numerals refer to the like elements throughout. The present invention may, however, be embodied in many different forms and should not be construed as being limited to the embodiments set forth herein. Rather, this embodiment is provided so that the present disclosure will be thorough and complete, and will fully convey the concept of the invention to those skilled in the art.

Figure 3A:
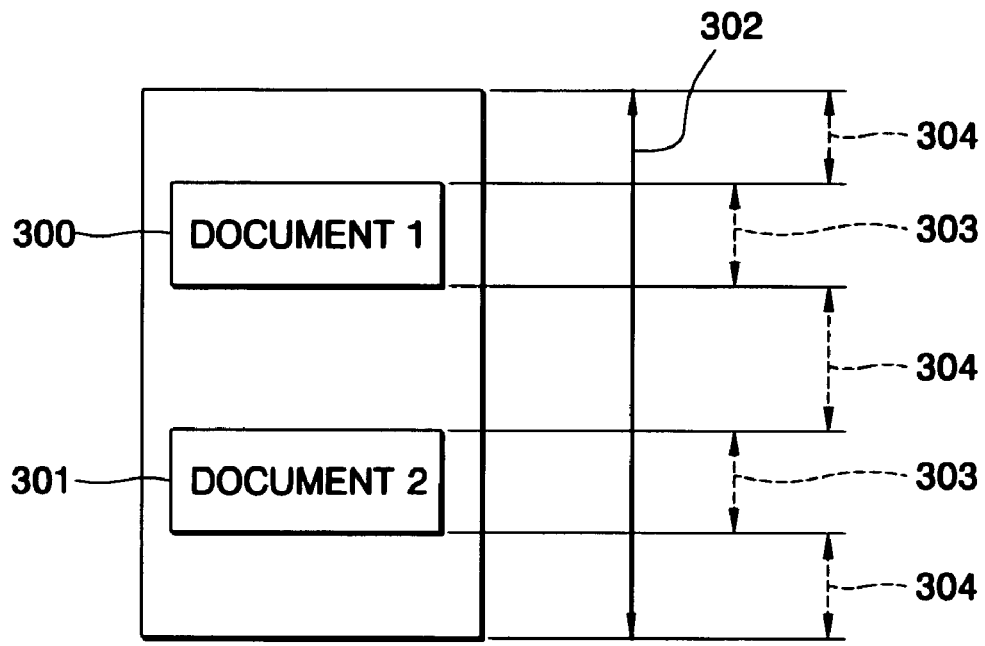
FIG. 3A is a view illustrating a pre-scan area and main-scan areas for two documents according to an embodiment of the present invention.
Figure 3B:
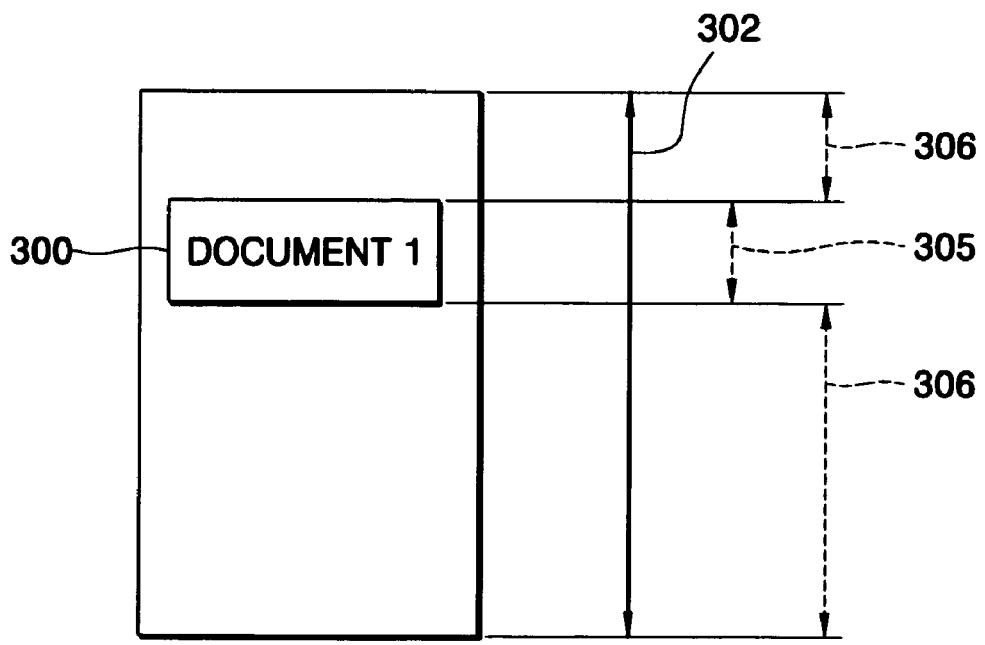
FIG. 3B is a view illustrating a pre-scan area and a main-scan area for one document according to another embodiment of the present invention.

FIG. 3A illustrates a pre-scan area and main-scan areas for scanning two or more documents, according to an embodiment of the present invention, and FIG. 3B illustrates a pre-scan area and a main-scan area for scanning one document, according to an aspect of the present invention.

Figure 2A:
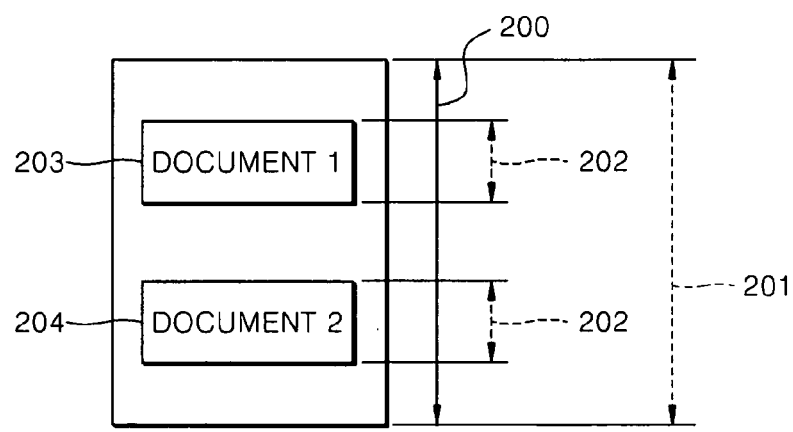
FIG. 2A is a view illustrating conventional scan areas.
Figure 2B:
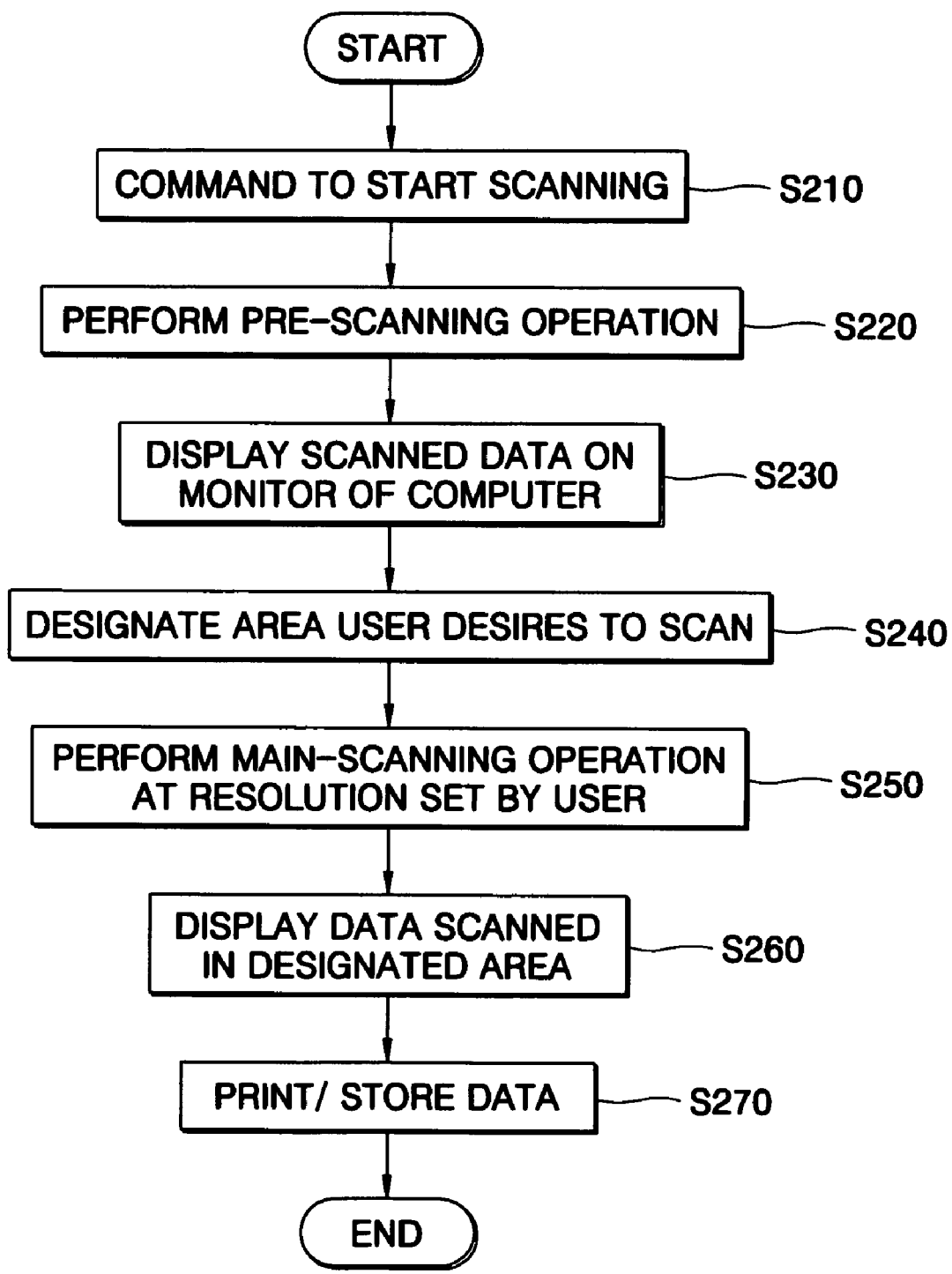
FIG. 2B is a flowchart of a conventional method of scanning a document.

Referring to FIG. 3A, a document-1 300 and a document 2-301 are objects to be scanned. The document-1 300 and the document 2-301 have sizes the size of business cards, small-sized photographs, credit cards, ID cards, etc. When two or more documents are scanned at the same time, according to the known art described with reference to FIG. 2A, a two-time scanning operation must be carried out. In other words, a user performs a pre-scanning operation in the physical scan area 200 to generate image data having a low resolution. Next, the user designates the main-scan areas 202 of the document-1 203 and the document-2 204 on a displayed screen and performs a main-scanning operation for the main-scan areas 202 to generate image data of the document-1 203 and the document-2 204. However, according to the present invention, a user can generate image data of the document-1 300 and the document-2 301 in main-scan areas 303 via a one-time scan command.

FIG. 3B shows one document. A main-scan area 305, not a physical scan area 302, is an object to be main-scanned, and pre-scan areas 306 are not main-scanned, but pre-scanned.

Figure 4:
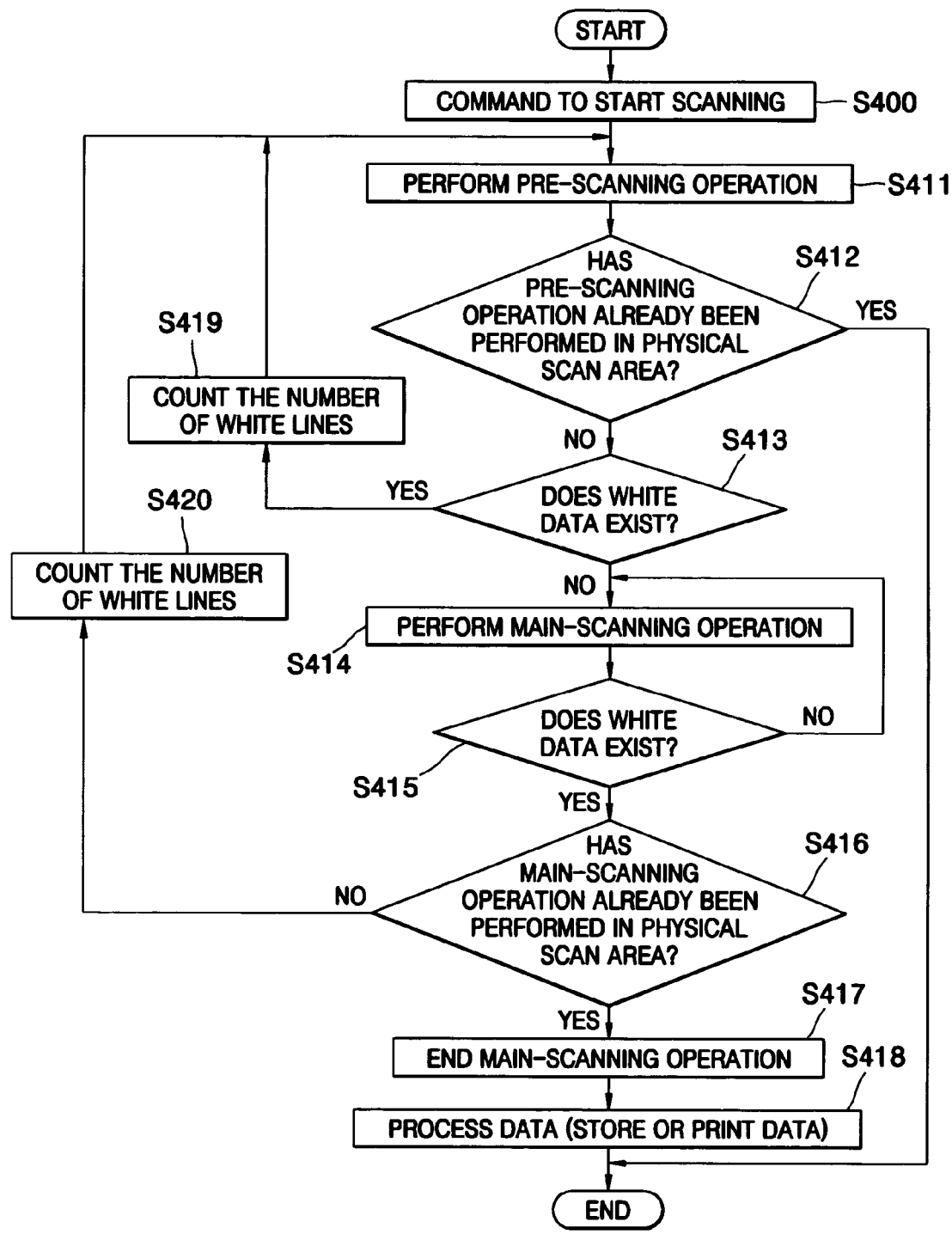
FIG. 4 is a flowchart for explaining a method of scanning a document according to an aspect of the present invention.

FIG. 4 is a flowchart of a method of scanning a main-scan area, according to the present invention, when a user does not specify the number of documents to be scanned. Referring to FIG. 4, at operation S400, a user positions a document to be scanned and selects a scan command. At operation S411, the scan command is transmitted to the scanner 101 via the controller 107 and the scanner 101 performs a pre-scanning operation at a predetermined resolution and speed to sense a starting portion of the document.

Conventionally, the pre-scanning operation refers to a method of scanning all the image data of an original copy at a low resolution of 75 dpi, for example, selecting a portion of the image data using a PC program at a high resolution, and scanning the portion of the image data. However, in the present invention, the pre-scanning operation is performed only until a starting portion of a document is sensed. Thus, the generation of unnecessary image data having a low resolution due to the pre-scanning operation, as in the known art, can be prevented. Also, because the pre-scanning operation performed to generate image data having a low resolution can be omitted, scanning a document can be performed faster than for conventional scanning.

The pre-scanning operation and a main-scanning operation that are described below are performed line by line. At operation S412, whether the pre-scanning operation has passed an image at the starting portion of the document (i.e., whether the pre-scanning operation has already been performed in a physical scan area), is checked until the pre-scanning operation is performed in a main-scan area. At operation S413, whether white data exist is checked. At operation S419, the number of white lines in which white data exists is counted. For example, because a shuttle scanner uses a charge coupled device (CCD) having a size of 128 to 160 dots, the shuttle scanner divides an A4-sized document into 22 to 27 lines to scan the A4-sized document. When a user gives a scan command, even if a document to be scanned has not been placed in the scanner, the shuttle scanner may perform the pre-scanning operation to the end of the physical scan area, and then stop the pre-scanning operation at the end of the physical scan area.

If a main-scan area in which a document is positioned is sensed during the pre-scanning operation, at operation S414, the scanner 101 performs a main-scanning operation in the main-scan area to generate image data of the document. In this case, the pre-scanning operation is carried out faster than the main-scanning operation. Thus, when the main-scan area is sensed, and then the process goes to the main-scanning step, the main-scan area has already been sensed to a degree. Therefore, a proper correction operation has to be performed based on the speed of the pre-scanning operation.

The correction operation is performed to correct a difference in scanning resolution due to the difference between the pre-scanning and main-scanning speeds. Because the pre-scanning speed is higher than the main-scanning speed, the main-scanning area, such as a physical area, may be sensed during pre-scanning. Accordingly, when the main-scanning operation is performed, because part of the main-scanning area has already been scanned during pre-scanning, a difference in scanning resolution due to the difference between the scanning speeds should be corrected for the pre-scanned physical area.

For this correction operation, the number of white lines must be continuously counted during the pre-scanning operation. However, the degree of accuracy of the correction operation depends on the characteristics of the scanning device used, and, thus, detailed correction standards will not be described herein.

In step S415, whether white data exist is continuously checked by performing the main scanning operation at operation S414 to sense the end portion of the document. At operation S416, whether the main-scanning operation has already been performed in the physical scan area is continuously checked. If the main-scanning operation has already been performed in the physical scan area, at operation S417, the main-scanning operation ends. Image data that have been generated up to this point are properly processed. In detail, the image data are stored, or the image data are converted into print data, transmitted to a printer, and printed. However, if at operation S415, white data are sensed and at operation S416, the main-scanning operation has not yet been performed at the current location in the physical scan area, at operation S420, the number of white lines is counted to scan the next document, and then the process returns to operation S411. The operations performed after operation S411 are as described above, and thus descriptions of these operations are omitted.

Figure 5A:
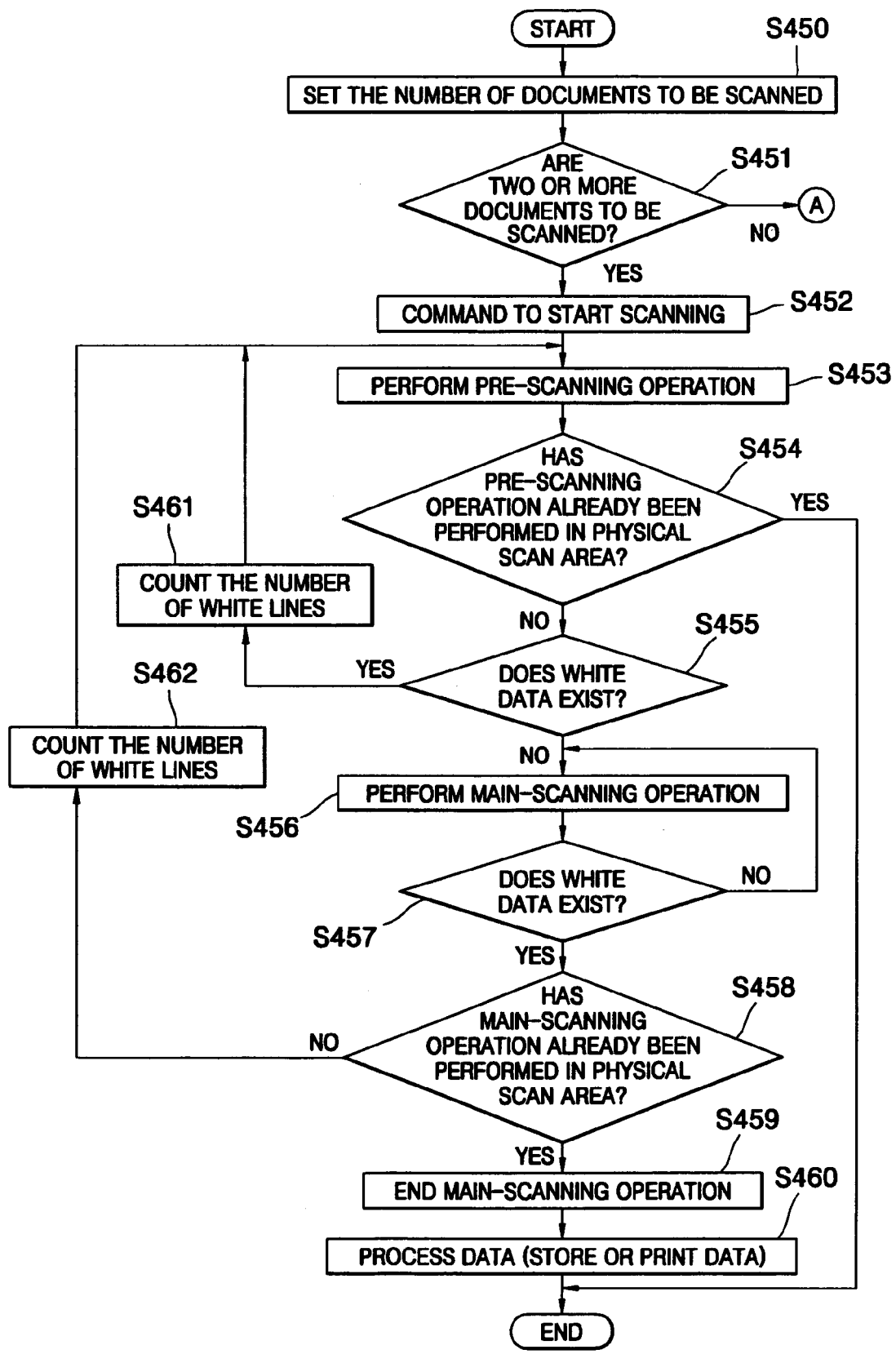
FIG. 5A is a flowchart of a method of scanning a document when a user sets two or more documents to be scanned according to the present invention.
Figure 5B:
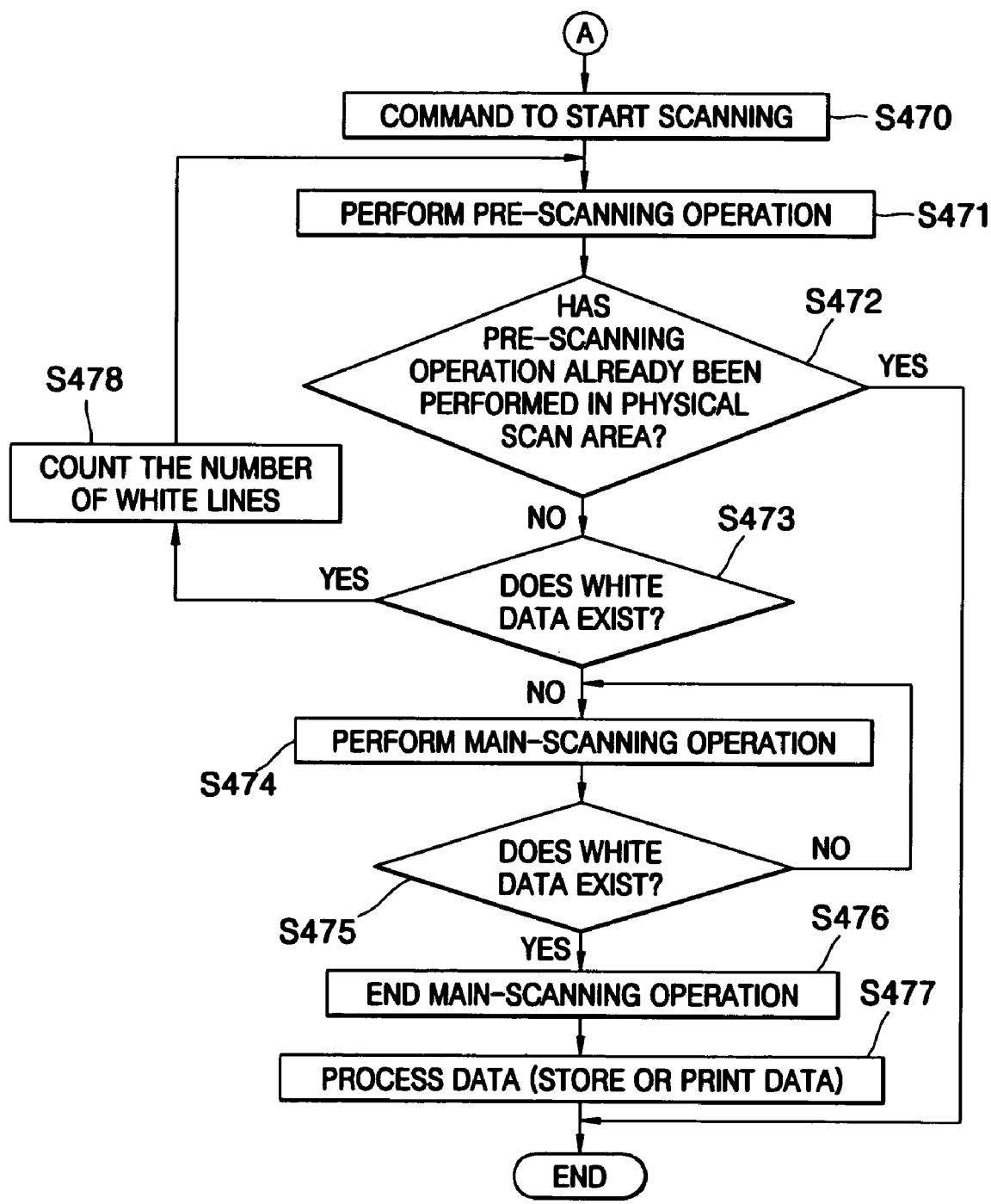
FIG. 5B is a flowchart of a method of scanning a document when a user sets one document to be scanned according to the present invention.

FIG. 5A is a flowchart of a process of scanning main-scan areas when two or more documents are to be scanned, and FIG. 5B is a flowchart of a process of scanning a main-scan area when one document is to be scanned. Unlike the process of FIG. 4, in FIGS. 5A and 5B, the user inputs the number of documents to be scanned via the manipulator 104.

Referring to FIGS. 5A and 5B, at operation S450, the user positions documents to be scanned in the multi-functional peripheral device and sets the number of documents to be scanned via the manipulator 104 (shown in FIG. 1) before giving a scan command. If the number of documents to be scanned is two, the process presented in FIG. 5A is performed. If one document is to be scanned, the process presented in FIG. 5B is performed. First, referring to FIG. 5A, at operation S451, whether two or more documents are to be scanned is determined. If two documents are to be scanned, at operation S452, the user gives the scan command, and the scan command is transmitted to the scanner 101 via the controller 107. At operation S453, the scanner 101 performs a pre-scanning operation at a predetermined resolution and speed to sense a starting portion of one of the documents. At operation S454, whether the pre-scanning operation has already been performed in the physical scan area is continuously checked until the pre-scanning operation is performed in the main-scan area in which the document being scanned is positioned. At operation S455, whether white data exist is checked, and at operation S461, if white data exist, the number of white lines contained in the white data is counted. If the document to be scanned has not been placed in the multi-functional peripheral device, at operation S454, the scanner 101 performs the pre-scanning operation to the end of the physical scan area and ends the pre-scanning operation at the end of the physical scan area.

However, if the document has been placed in the main-scan area and is sensed during the pre-scanning operation, at operation S456, the scanner 101 performs the main-scanning operation for the document to generate image data of the document. At operation S457, whether white data exist is continuously checked by performing operation S456. If at operation S457 white data are sensed during the main-scanning operation, at operation S458, whether the main-scanning operation has already been performed in the physical scan area is checked. If the main-scanning operation has already been performed in the physical scan area, at operation S459, the main-scanning operation ends, and at operation S460, image data that have been generated up to this point are properly processed.

If at operation S458, the main-scanning operation is not being performed in the physical scan area, the number of white lines is counted at operation S462, and then the process returns to operation S453 to sense a starting portion of the next document (i.e., a starting portion of the main-scan area). Operations performed after operation S453 are as described above, and, thus, the descriptions of these operations are omitted.

If at operation S451, there is only one document to be scanned, the operations presented in FIG. 5B are performed. At operation S470, the user gives the scan command, and at operation S471, a pre-scanning operation is performed. At operation S472, whether the pre-scanning operation has already been performed in the physical scan area is checked. If at operation S472, the pre-scanning operation has already been performed in the physical scan area, the pre-scanning operation ends. If at operation S472, the pre-scanning operation is still being performed in the physical scan area, at operation S473, whether white data exist is checked. If white data exist, at operation S478, the number of white lines contained in the white data is counted, and then the process returns to operation S471 to perform the pre-scanning operation starting from the next line of the document. If a starting portion of the document to be scanned is sensed, that is, at operation 473, white data are sensed, at operation S474, the multi-functional peripheral device performs a main-scanning operation for the document. At operation S475, whether white data exist is continuously checked to sense an ending portion of the document by performing operation S474. If white data are sensed, at operation S476, the multi-functional peripheral device ends the main-scanning operation, and at operation S477, the multi-functional peripheral device processes the image data that are generated during the main-scanning operation (i.e., converts the image data into print data to print or stores the image data). In the process presented in FIG. 5B, because one document is to be scanned, after the main-scanning operation ends in the main-scan area in which the document is positioned, it is unnecessary to repeat a pre-scanning operation to seek another document.

As described above, according to the present invention, by performing a main-scanning operation in a main-scan area in which a document is positioned and a pre-scanning operation in an area in which the document is not positioned, image data of the document can be generated at a resolution and speed set by a user by a one-time scanning operation, rather than a two-time scanning operation according to the known art. The present invention has been described as being applied to a multi-functional peripheral device, but may be applied to any device having a scanning.

Also, an existing pre-scanning operation can be performed to sense a starting portion of a main-scan area (i.e., a starting portion of a document). Thus, the time required, and the amount of data necessary, for generating an image having a low resolution can be reduced.

Moreover, when a plurality of business card-sized documents are sensed, image data of the plurality of business card-sized documents can be generated through only a one-time scanning operation. Thus, scanning can be simply performed, and, in particular, scanning can be conveniently performed at places such as government and public offices where work pertaining to scanning or copying ID cards, photographs, business cards, etc., is repeatedly performed.

Although preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of scanning a document to generate image data of the document using a multi-functional peripheral device by scanning at least one document, the method comprising:
    inputting a scan start command through a manipulator of the multi-functional peripheral device for the at least one document;
    performing a pre-scanning operation at a first predetermined resolution and speed until a current scanning area is located in a starting location of a first main-scan area;
    stopping the pre-scanning operation when the current scanning area is located in the starting location of the first main-scan area; and
    starting a main-scanning operation at a second predetermined resolution and speed from the starting location of the first main-scan area:
    performing the main-scanning operation until the current scanning area is located in an ending location of the first main-scan area; and
    performing the pre-scanning operation until the current scanning area is located in an ending location of a physical scan area of the multi-functional peripheral device or a starting location of a second main-scan area, when the current scanning area is beyond the ending location of the first main-scan area,
    wherein the pre-scanning operation and the main-scanning operation are performed according to the one-time scan start command, and the ending location of the physical scan area is determined by using white data.

2. The method of claim 1, wherein said performing a main-scanning operation comprises scanning a document sensed during the pre-scanning operation to generate image data of the document.

3. The method of claim 1, further comprising inputting a number of documents for which image data are to be generated.

4. The method of claim 3, further comprising, if the number of documents input is one, ending scanning of the document after said performing a main-scanning operation ends.

5. The method of claim 3, further comprising, if the number of documents input is two or more, sensing a starting portion of a subsequent document after said performing a main-scanning operation ends by repeating said performing a pre-scanning operation.

6. A method of scanning documents to generate image data of the document using a multi-functional peripheral device by scanning one or more documents, the method comprising:
    placing one or more documents to be scanned within a physical scan area;
    in putting a scan start command through a manipulator of the multi-functional peripheral device for the documents placed on the physical scan area;
    performing a pre-scanning operation at a first predetermined resolution and speed until a current scanning area is located in a starting location of a main-scan area of a first document of the documents;

stopping the pre-scanning operation when the current scanning area is located at the starting location of the main-scan area of the first document;

starting a main-scanning operation at a second predetermined resolution and speed from the starting location of the main-scan area of the first document;

performing the main-scanning operation until the current scanning area is located in an ending location of the main-scan area of the first of the document; and after performing the main-scanning operation until the ending location of the main-scan area of the first document, sequentially repeating the performing the pre-scanning operation, the stopping the pre-scanning operation, and the performing the main-scanning operation on the remaining documents of the documents until the current scanning area is located in the physical scan area, wherein the performing the pre-scanning operation, the stopping the pre-scanning operation, the starting the main-scanning operation, the performing the main-scanning operation, and the sequentially repeating are performed according to the one-time scan start command, and the ending location of the physical scan area is determined by using white data.

7. A multi-functional peripheral device for scanning a document, the multi-functional peripheral device comprising:

one or more documents placed on a physical scan area of the multi-functional peripheral device;

a manipulator for inputting a scan start command for the documents placed on the physical scan area;

a scanner comprising an optical system for outputting an electric signal by photoelectric transforming density of the documents placed on the physical scan area according to the scan start command, and an image processor for converting the electric signal output from the optical system into digital image data;

a controller controlling the scanner so as to perform a pre-scanning operation at a first predetermined resolution and speed until a current scanning area is located in a starting location of a first main-scan area, stop the pre-scanning operation when the current scanning area is located in the starting location of the first main-scan area, start a main-scanning operation at a second predetermined resolution and speed from the starting location of the first main-scan area, perform the main-scanning operation until the current scanning area is located in an ending location of the first main-scan area, and perform the pre-scanning operation until the current scanning area is located in an ending location of a physical scan area of the multi-functional peripheral device or a starting location of a second main-scan area, when the current scanning area is beyond the ending location of the first main-scan area, wherein the pre-scanning operation and the main-scanning operation are performed according to the one-time scan start command, and the ending location of the physical scan area is determined by using white area.

8. The multi-functional peripheral device of claim 7, wherein the first predetermined resolution and speed are set by a user or set depending on characteristics of the scanner.

9. The multi-functional peripheral devices of claim 7, wherein the speed of the pre-scanning operation is greater than the speed of the main-scanning operation.

10. The multi-functional peripheral device of claim 7, wherein a size of a document to be scanned is the same size as a business card.

11. The method of claim 1, wherein the performing of the pre-scanning operation comprises performing the pre-scanning operation without displaying a scanned area to a user.

12. The method of claim 1, wherein the sensing comprises automatically sensing.

13. The method of claim 1, further comprising storing or printing image data obtained through the main-scanning operation.

14. The multi-functional peripheral device of claim 7, wherein image data obtained through the main-scanning operation is stored in a memory or printed through a printer.

* * * * *

UNITED STATES PATENT AND TRADEMARK OFFICE
CERTIFICATE OF CORRECTION

PATENT NO.        : 7,734,120 B2
APPLICATION NO. : 10/748657
DATED              : June 8, 2010
INVENTOR(S)      : Kyoung-jae Lee It is certified that error appears in the above-identified patent and that said Letters Patent is hereby corrected as shown below:

Column 8, Line 56 (Approx.) delete "documents" and insert --a document--.

Column 8, Line 61 delete "in putting" and insert --inputting--.

Column 10, Line 22 delete "devices" and insert --device--.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,734,120 B2 | Page 1 of 1 |
| APPLICATION NO. | : 10/748657 | |
| DATED | : June 8, 2010 | |
| INVENTOR(S) | : Kyoung-jae Lee | |

It is certified that error appears in the above-identified patent and that said Letters Patent is hereby corrected as shown below:

Column 9, Line 9, before "document;" delete "of the".

Signed and Sealed this

Seventh Day of December, 2010

David J. Kappos
*Director of the United States Patent and Trademark Office*